(12) United States Patent
Petrilla et al.

(10) Patent No.: US 8,494,376 B2
(45) Date of Patent: Jul. 23, 2013

(54) METHOD AND APPARATUS FOR TESTING TRANSMITTERS IN OPTICAL FIBER NETWORKS

(75) Inventors: John F. Petrilla, Palo Alto, CA (US); Rudy L. Prater, Campbell, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1096 days.

(21) Appl. No.: 12/102,099

(22) Filed: Apr. 14, 2008

(65) Prior Publication Data

US 2009/0257745 A1    Oct. 15, 2009

(51) Int. Cl.
*H04B 10/04* (2006.01)
*G02F 1/01* (2006.01)

(52) U.S. Cl.
CPC .................................. *G02F 1/0136* (2013.01)
USPC ............................ 398/186; 398/152; 398/185

(58) Field of Classification Search
USPC .......................................... 398/186, 152, 185
See application file for complete search history.

(56) References Cited

U.S. PATENT DOCUMENTS

| | | | |
|---|---|---|---|
| 5,714,878 A * | 2/1998 | Saito et al. | 324/121 R |
| 5,774,242 A * | 6/1998 | O'Sullivan et al. | 398/29 |
| 5,978,742 A * | 11/1999 | Pickerd | 702/66 |
| 6,430,715 B1 * | 8/2002 | Myers et al. | 714/704 |
| 6,433,899 B1 * | 8/2002 | Anslow et al. | 398/5 |
| 6,519,302 B1 * | 2/2003 | Bruce et al. | 375/355 |
| 6,760,676 B2 * | 7/2004 | Nygaard, Jr. | 702/79 |
| 6,806,877 B2 * | 10/2004 | Fernando | 345/440 |
| 7,019,746 B2 * | 3/2006 | Shubert et al. | 345/440 |
| 7,181,146 B1 * | 2/2007 | Yorks | 398/195 |
| 7,310,389 B2 * | 12/2007 | Waschura et al. | 375/340 |
| 7,406,267 B2 * | 7/2008 | Mahgerefteh et al. | 398/201 |
| 7,474,851 B2 * | 1/2009 | Inman et al. | 398/22 |
| 7,643,752 B2 * | 1/2010 | Swenson et al. | 398/26 |
| 7,711,265 B2 * | 5/2010 | Inman et al. | 398/22 |
| 2006/0222370 A1 * | 10/2006 | DeCusatis et al. | 398/135 |
| 2007/0098415 A1 * | 5/2007 | Lupo et al. | 398/197 |
| 2009/0257745 A1 * | 10/2009 | Petrilla et al. | 398/30 |

* cited by examiner

*Primary Examiner* — Danny Leung

(57) ABSTRACT

An eye mask is provided that is defined at least partially in terms of absolute, or non-relative, optical power level values. In essence, the eye mask of the invention is a hybrid of the traditional eye mask in that the eye mask of the invention includes power level values on the optical power axis that are based on the minimum OMA set forth in the applicable standard or data sheet specification rather than on measured power level values obtained from the part being tested. Using the hybrid eye mask of the invention obviates the need to perform at least some of the tests often used to measure transmitter attributes. In addition, using the hybrid eye mask of the invention reduces the possibility that a transmitter may fail the eye mask test even though the transmitter operates satisfactorily.

22 Claims, 6 Drawing Sheets

TRANSMITTER ATTRIBUTES

| 10 Gb/S ETHERNET STANDARD P802.3ae | FIBRE CHANNEL STANDARD FC-PI-4 |
|---|---|
| CENTER WAVELENGTH RANGE | CENTER WAVELENGTH RANGE |
| RMS SPECTRAL WIDTH | RMS SPECTRAL WIDTH |
| AVERAGE LAUNCH POWER MAX | AVERAGE LAUNCH POWER MAX |
| AVERAGE LAUNCH POWER MIN | AVERAGE LAUNCH POWER MIN |
| MIN OMA | MIN OMA |
| AVERAGE OFF LAUNCH POWER MAX | |
| MIN EXTINCTION RATIO | |
| RIN12OMA | RIN12OMA |
| TDP PENALTY | |
| MIN OPTICAL RETURN LOSS TOLERANCE | |
| ENCIRCLED FLUX | |
| TX EYE MASK DEFINITION (X1,X2,X3,Y1,Y2,Y3) | TX EYE MASK DEFINITION (X1,X2,X3,Y1,Y2,Y3) |
| | RISE AND FALL TIMES |
| | DJ |
| | TJ |
| | PWS |

TABLE 1

*FIG. 1*
*(PRIOR ART)*

METHOD AND APPARATUS FOR TESTING TRANSMITTERS IN OPTICAL FIBER NETWORKS

TECHNICAL FIELD OF THE INVENTION

The invention relates to optical fiber networks over which data is communicated in the form of optical signals transmitted and received over optical waveguides. More particularly, the invention relates to a method and an apparatus that use a hybrid eye mask to perform eye mask testing on a transmitter of an optical fiber network.

BACKGROUND OF THE INVENTION

In optical communications networks, optical transceiver modules are used to transmit and receive optical signals over optical fibers. A transceiver module generates amplitude modulated optical signals that represent data, which are then transmitted over an optical fiber coupled to the transceiver. The transceiver module includes a transmitter side and a receiver side. The transmitter and receiver sides may be controlled by a transceiver controller. The transmitter side typically includes a laser driver and a laser diode. The laser driver outputs electrical signals to the laser diode that modulate the optical power of the laser diode in accordance with a particular modulation scheme (e.g., a binary encoding scheme) to produce output power levels corresponding to logic 1s and logic 0s. Other modulation schemes exist, including schemes that use modulators that are separate from the laser diode and that have other than two output levels. An optical system of the transceiver module focuses the coherent light produced by the laser diode into the end of a transmit optical fiber.

On the transmitter side, a monitor photodiode typically monitors the output power levels of the laser diode and produces respective feedback signals that are fed back to the transceiver controller, which processes them to ascertain the average output power level of the laser diode. The transceiver controller outputs control signals to the laser driver to cause it to adjust the bias current signal output to the laser diode such that the average output power level of the laser diode is maintained at a relatively constant level. A receive photodiode on the receiver side receives an incoming optical signal output from the end of a receive optical fiber. An optics system of the receiver portion focuses the light output from the end of the receive optical fiber onto the receive photodiode. The receive photodiode converts the incoming optical signal into an electrical signal, which is then processed by other circuitry of the receiver side, such as amplification circuitry or clock and data recovery circuitry, for example.

Various types of tests are performed on the transmitter of the transceiver module to determine if it will operate as intended and provide a sufficient signal for a receiver to recover. For example, a variety of tests are often performed on the optical waveform using a communications signal analyzer (CSA). One such test is known as an eye mask test. An eye mask is a template that defines display regions where the waveform is permitted and regions where the waveform should not occur. To perform an eye mask test, a pattern generator of the CSA generates bit sequences, which are used to modulate the laser diode of the transmitter. Optical-to-electrical circuitry of the CSA converts the optical waveform into an electrical waveform. A sampling oscilloscope of the CSA repetitively samples the electrical waveform and displays a superposition of digitized time-domain representations of the waveform on the display monitor of the CSA. The displayed superimposition of the waveform is commonly referred to as an eye diagram due to the fact that it resembles a human eye. An eye mask can also be displayed on the display monitor. By viewing the displayed eye diagram and its relationship to the displayed eye mask, the engineer or technician performing the analysis can, at a glance, partially determine whether the transmitter will perform as expected.

In general, an eye mask represents a combination of requirements, dynamic response characteristics of overshoot and ringing that are not otherwise specified, as well as transition times and jitter attributes that may have additional specifications, for the transmitter output signal. An eye mask typically comprises three polygons: one above the eye diagram, one inside of the eye diagram and one below the eye diagram. The three mask regions constrain the dynamic response, overshoot and ringing, of the transmitter to that tolerated by receiver. The inner polygon defines the open eye requirements and constrains the transitions times, jitter and separation between signal levels such that the receiver can distinguish between them. A variety of eye masks have been defined by various communications standards to ensure that the corresponding signal has acceptable quality. When an eye mask test is to be performed, the person performing the test uses controls on the signal analyzer to select the appropriate mask to be applied to the signal waveform being measured. During testing, attributes of the transmitter can be ascertained based on whether the eye diagram extends into the eye mask regions and based on how near the eye diagram is to the eye mask regions, which is commonly referred to as the mask margin.

Eye mask tests are typically performed on parts after they have been manufactured, but prior to the product being shipped to the customer. Using an eye mask defined by the appropriate standard, the user is able to determine whether the corresponding eye diagram extends into one of the mask regions defined by the eye mask, which is commonly referred to as a "hit" on the mask. For some standards, if the eye diagram hits one of the eye mask regions, the transmitter is deemed to be noncompliant with the associated standard. In general, if the transmitter is deemed to be noncompliant with the associated standard, the part containing the transmitter is deemed to be unsuitable for shipment to the customer. Thus, a hit on the eye mask region results in reduced manufacturing yield. In addition to the requirement that there be no hits on the eye mask, customers often require that the manufacturer determine the mask margin and ship parts to the customer that have a particular minimum mask margin. For example, a particular customer may require a mask margin of at least 10%.

Eye mask tests generally are not used to perform quantitative analyses of signal quality attributes such as signal rise and fall times and jitter or engineering verification of a product or detailed product characterization. Rather, eye mask tests currently used are best suited for determining if high probability deterministic characteristics of the signal are compliant with the applicable communications standard. Under suitable conditions, eye masks can also be used to evaluate lower probability characteristics of the signal. An eye diagram is generally deemed to be compliant with the applicable standard if the eye diagram does not "hit" a mask region.

A variety of quantitative tests are used for particular transmitter attribute measurements. FIG. 1 illustrates a table that contains a list of transmitter attributes including the eye mask definition that are required by two different communications standards, namely, the 10 gigabit per second (Gb/s) Ethernet standard P802.3ae and the Fibre Channel standard FC-PI-4. It can be seen from the table that these standards require a variety of tests to be performed in addition to performing the eye mask test. Performing these additional tests consumes time and effort, and generally requires the use of additional test equipment and additional fixtures on the test equipment. Performing these additional tests also increases overall costs.

One of the problems associated with the current eye mask testing methodology is that it is possible for a transmitter that actually performs satisfactorily to fail the eye mask test. In other words, when performing eye mask testing using the current methodology, one or more hits by the eye diagram on the eye mask defined by the applicable communications standard equates to a finding that the transmitter is noncompliant with the standard. When this happens, the transmitter is generally deemed unsuitable for shipment to the customer. In addition, with the current eye mask testing methodology, even if there are no hits on the eye mask, the transmitter may be deemed unsuitable for shipment to the customer if the eye diagram is compliant with the mask dictated by the standard, but fails to meet a margin to the mask (the "mask margin") dictated by customer needs. In either case, the determination that the transmitter is unsuitable for shipment results in reduced manufacturing yield, which increases manufacturing costs.

However, even if the eye diagram hits on the applicable eye mask, or has a mask margin that is less than that required by the standard, this does not necessarily mean that the transmitter does not operate satisfactorily. For example, if the transmitter provides more than the minimum required output modulation amplitude than that required by the applicable standard, it is quite possible that the transmitter will operate satisfactorily despite the eye diagram appearing partially closed. Nevertheless, using the current eye mask testing methodology, such a transmitter would be deemed to be unsuitable for shipment to the customer.

It would be desirable to provide an eye mask test that would eliminate the need to perform separately at least some of the tests that are currently performed to measure many of the attributes listed in the table shown in FIG. 1. Eliminating the need to perform many of these additional tests would reduce the time, effort and cost associated with testing, thereby reducing the amount of time that is required to make the product available to the customer as well as the costs associated with manufacturing and testing the transmitters. It would also be desirable to provide an eye mask test that reduces the possibility that a transmitter may fail the eye mask test even though the transmitter operates satisfactorily.

SUMMARY OF THE INVENTION

The invention provides a method and apparatus for performing eye mask testing using a hybrid eye mask. The method comprises receiving a predetermined optical modulation amplitude (OMA) value, and generating a hybrid eye mask based at least in part on the predetermined OMA value.

The apparatus comprises a memory device and a computational device. The computational device receives a predetermined OMA value and generates a hybrid eye mask based at least in part on the predetermined OMA value.

These and other features and advantages of the invention will become apparent from the following description, drawings and claims.

BRIEF DESCRIPTION OF THE DRAWINGS

FIG. 1 illustrates a table that contains a list of transmitter attributes including the eye mask definition that are required by two different standards, namely, the 10 Gb/s Ethernet standard P802.3ae and the Fibre Channel FC-PI-4 standard.

DETAILED DESCRIPTION OF AN ILLUSTRATIVE EMBODIMENT

Figure 2:
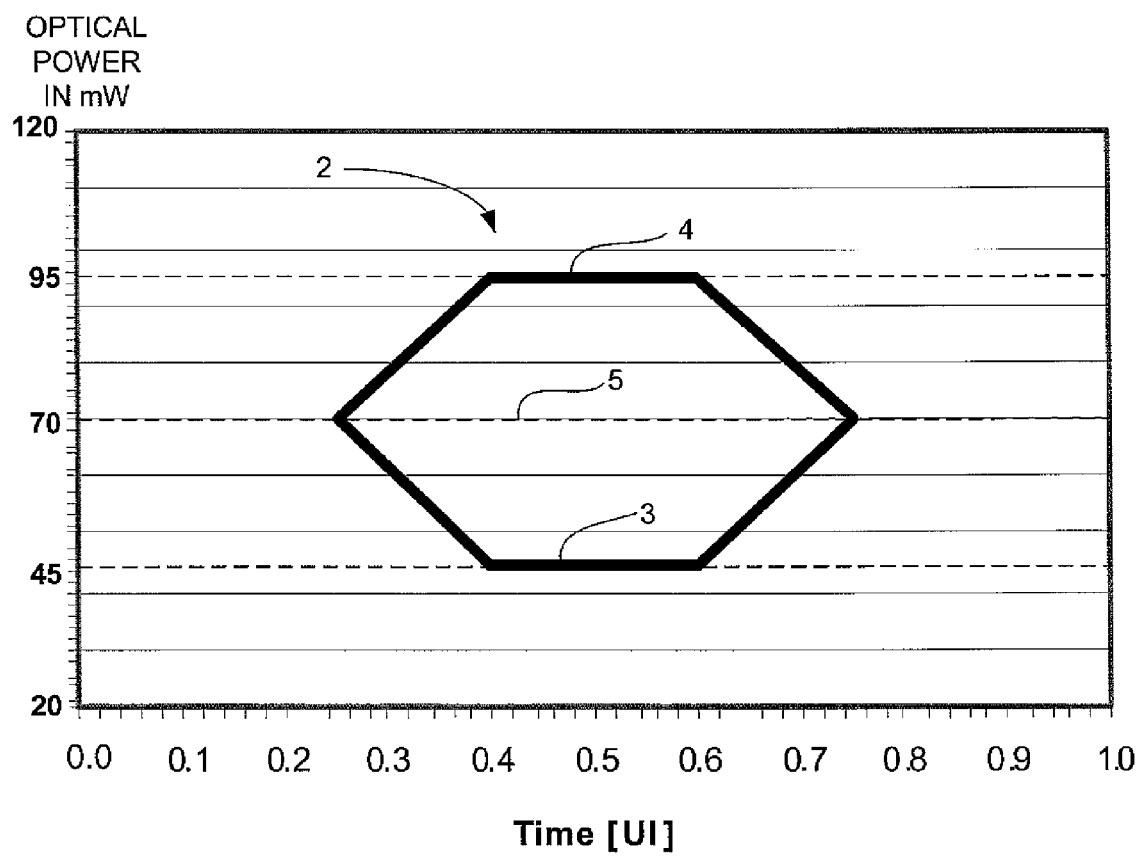
FIG. 2 illustrates the center polygon of a known eye mask that is defined in terms of relative power level values on the vertical axis, and which is commonly applied to eye diagrams to perform eye mask compliance testing.

In accordance with the invention, an eye mask is provided that is defined at least partially in terms of absolute, or non-relative, optical power level values. In essence, the eye mask of the invention is a hybrid of the traditional eye mask in that the eye mask of the invention includes power level values and mask coordinates on the power axis that are calculated based on the OMA set forth in the applicable standard or data sheet specification rather than on measured power level values obtained from the part being tested. Use of the hybrid eye mask of the invention obviates the need to perform at least some of the tests often used to measure transmitter attributes listed in the table of FIG. 1. In addition, use of the hybrid eye mask of the invention reduces the possibility that a transmitter may fail the eye mask test even though the transmitter operates satisfactorily.

The term "absolute power level values", as that term is used herein, is meant to denote that the optical power level values that are used to denote the vertical axis coordinates of the hybrid eye mask of the invention are not normalized, i.e., not based on the measured values for the transmitter being tested. Rather, the absolute power level values of the hybrid mask of the invention are based either on requirements set forth in a standard or in a data sheet performance specification. The term "relative power level values", as that term is used herein, is intended to denote the normalized values that are commonly used to denote the vertical axis coordinates of the known eye mask, which are normalized to the measured power level values for the transmitter being tested. For the horizontal axis, i.e., the time axis, the hybrid mask preferably uses normalized time values in the same way that the known eye mask uses normalized time values.

As described above, one of the problems associated with the current eye mask testing methodology is that it is possible for a transmitter that actually performs satisfactorily to fail the eye mask test. In addition, with the current eye mask testing methodology, even if there are no hits on the eye mask, the transmitter may be deemed to be unacceptable if the eye diagram does not meet the mask margin dictated by the customer. In either case, the determination that the transmitter is unacceptable, either for noncompliance with the mask testing requirements set forth in the standard or for insufficient mask margin, results in reduced manufacturing yield, which increases manufacturing costs. A significant reason for this problem with the current eye mask testing methodology is that it uses relative power level values on the vertical axis that do not account for cases where the transmitter is providing more than the minimum required output modulation amplitude. In contrast, the hybrid eye mask of the invention uses absolute power level values on the vertical axis. To demonstrate the problem presented by the current testing methodology and the solution provided by the invention, a comparison between the known eye mask and the hybrid eye mask of the invention will now be provided with reference to FIGS. 2 and 3.

FIG. 2 illustrates an example of the center polygon of a known eye mask 2 defined in terms of relative power level values for a data set having a data optical modulation amplitude (OMA) of 100 milliwatts (mW). For ease of illustration and discussion, the upper and lower polygons of the eye mask are not shown in FIG. 2. The data OMA is calculated for the data set by taking the difference between the optical power level value for a level 1 and the optical power level value for a level 0. For this example, it will be assumed that the level 0 and level 1 values are 20 mW and 120 mW, respectively. With the current eye mask testing methodology, the eye mask values for the vertical axis are specified relatively such that the eye mask extends from 0.25 to 0.75 of the measured OMA. Thus, for this example, the lower level of the mask 2, which is designated by numeral 3, is at a relative power level value of (0.25×100 mW)+20 mW=45 mW and the upper level of the mask 2, which is designated by numeral 4, is at a relative power level value of (0.75×100 mW)+20 mW=95 mW. The combination of these upper and lower mask values define a required vertical eye opening of at least (95 mW−45 mW)=50 mW. The center level value of the mask 2, which is designated by numeral 5, has a relative power level value that is equal to the average of the lower and upper level mask values. Thus, in this example, the center level 5 of the mask 2 has a value of (95 mW+45 mW)/2=70 mW.

Figure 3:
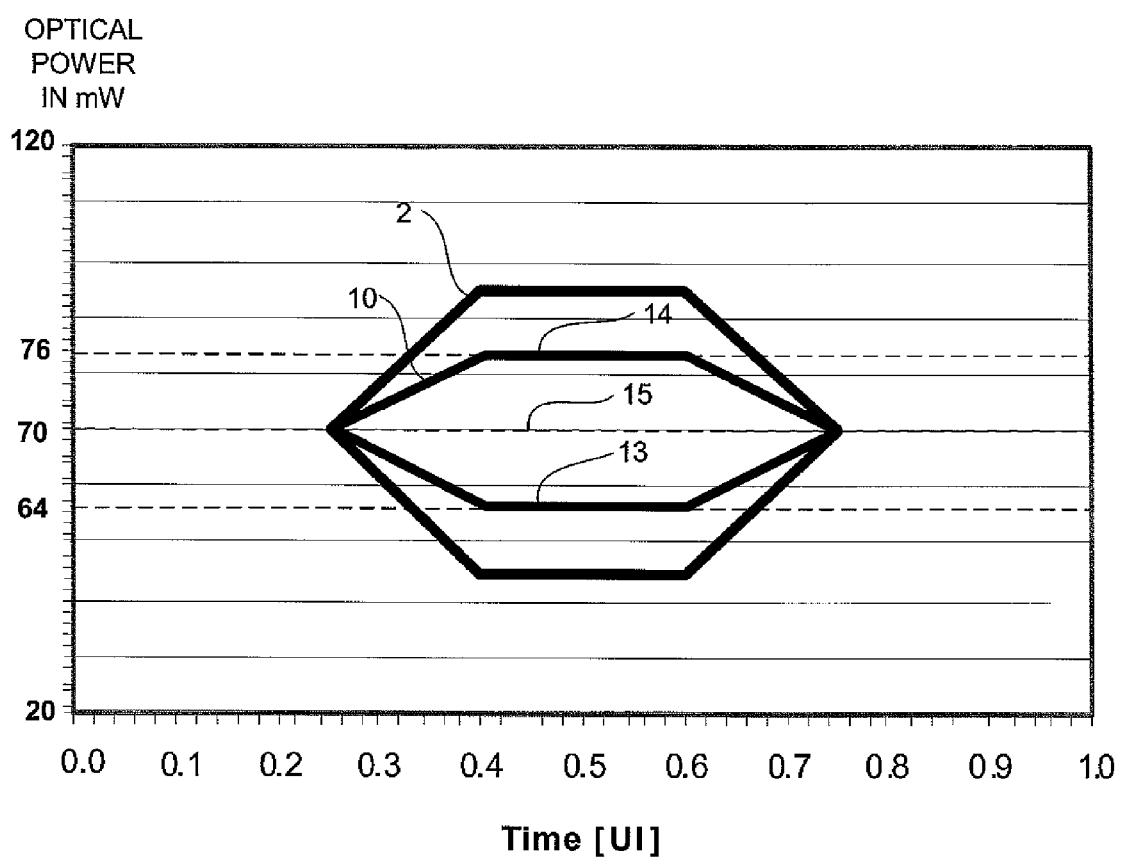
FIG. 3 illustrates the center polygon of a hybrid eye mask in accordance with an embodiment of the invention that is defined in terms of absolute power level values on the vertical axis.

FIG. 3 illustrates an example of the center, or inner, polygon of the hybrid eye mask 10 in accordance with an embodiment, wherein the power level values of the mask 10 are absolute power level values for a data set having the same data OMA and center power level value as the data set represented in FIG. 2. For ease of illustration and discussion, the upper and lower polygons of the eye mask are not shown in FIG. 3. For this example, it will be assumed that the applicable communications standard requires that the transmitter have a minimum data OMA of at least 24 mW and eye mask coordinates with the same time values as in FIG. 2. Therefore, the standard indirectly defines a required vertical eye opening of at least 12 mW, i.e., a vertical eye opening that extends from 25% to 75% of the 24 mW minimum data OMA. The lower, upper and center level values for the hybrid mask are calculated based on the minimum data OMA set forth in the standard (or in a data sheet performance specification) and mask definition dictated by the standard. These values are then offset based on the center level value of the gathered data set, as is described below in detail with reference to FIG. 5. For example, since the mask definition set forth in the applicable standard sets the lower and upper mask level values at 25% and 75%, respectively, the lower and upper mask level values are calculated, respectively, as 0.25×24 mW=6 mW and 0.75×24 mW=18 mW. As with the known mask described above with reference to FIG. 2, the center level value of the hybrid mask is calculated as the average of the hybrid mask upper and lower level values. Thus, in this example, the center level value of the hybrid mask is (6 mW+18 mW)/2=12 mW.

Having calculated the upper, lower and center level values of the hybrid mask, the hybrid mask is then vertically centered about the center level value of the data set. As indicated above with reference to FIG. 2, in this example the center level value of the data set is 70 mW. In order to center the hybrid mask at 70 mW, the upper, lower and center level values of the hybrid mask are each offset by an amount equal to (70 mW−12 mW)=58 mW. Thus, the upper, center and lower level values for the hybrid mask become 76 mW, 70 mW and 64 mW, respectively, and the center level value of the offset hybrid mask now coincides with the center level value of the data set.

Figure 4:
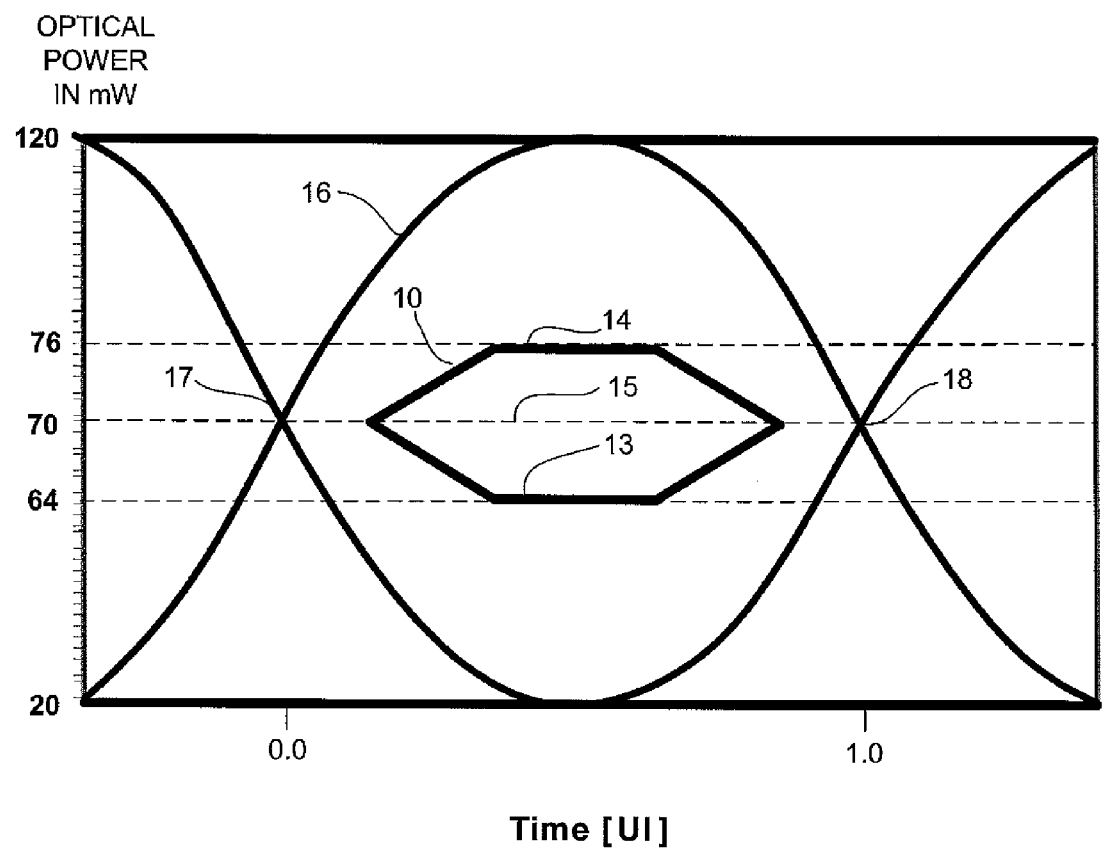
FIG. 4 illustrates an example of the hybrid eye mask shown in FIG. 3 and an eye diagram generated from a set of captured digital data samples.

FIG. 4 illustrates an example of the inner polygon of the hybrid eye mask 10 shown in FIG. 3 and an eye diagram 16 generated from a set of captured digital data samples. For ease of illustration and discussion, the upper and lower polygons of the eye mask are not shown in FIG. 4. As with the relative eye mask 2 shown in FIG. 2, preferably the hybrid eye mask 10 uses relative values for the horizontal axis coordinates. Thus, the horizontal axis coordinate values of the eye mask 10 are obtained by determining the two successive crossing points 17 and 18 of the eye diagram 16. The values on the horizontal axis are normalized time values.

As indicated above, a mask margin is a measurement that is often used to further characterize the data set. In order to determine the mask margin, the distance between the lower and upper levels of the mask is increased by expanding the mask and determining the largest mask margin that occurs for which there continue to be no data points on the interior of the mask (i.e., no "hits"). By comparing the masks 2 and 10 shown in FIGS. 2 and 3, respectively, it is readily seen that the hybrid mask 10 of the invention will provide considerably more mask margin than that provided by the known relative mask 2 for the same eye diagram. Consequently, a larger number of transmitters will pass the mask test that applies the hybrid mask 10 shown in FIG. 3 than will pass the mask test that applies the relative mask 2 shown in FIG. 2. Consequently, using the hybrid mask 10 will result in improved yield and lower manufacturing costs.

As described above, an eye mask combines requirements of signal transition times and jitter. In addition, the hybrid mask 10 described above with reference to FIG. 3 incorporates the minimum OMA requirement. This combination can ensure that the signal is sufficient to enable it to be correctly recovered by the receiver and eliminates the need to perform many of the tests currently performed to obtain the respective attributes listed in FIG. 1. For example, if the hybrid eye mask 10 of the invention is applied to an eye diagram corresponding to a set of data gathered for a particular transmitter, a determination can easily be made based on the information displayed on the display screen of the CSA as to whether the following attributes listed in FIG. 1 are acceptable: minimum OMA (Min OMA); minimum extinction ratio (Min ER); Average Launch Power; Rise and Fall Times; deterministic jitter (DJ); pulse width shortening (PWS); and total jitter (TJ). The effect of RIN12OMA is captured as random jitter in TJ measurements. Because it is possible to calculate the OMA and compare it to the Min OMA specification as soon as the captured set of data samples is available for processing, satisfaction of Min OMA, ER and Average Launch Power requirements may be ascertained during the mask set-up process In addition, because TDP penalty is defined in a way that combines the effects of transition times and jitter, it also becomes unnecessary to determine TDP penalty. In other words, clearing the hybrid mask inner polygon requires that the signal of the transmitter under test have a combination of sufficiently large OMA and sufficiently small jitter and transition times including ringing. Clearing the outer polygons requires the signal of the transmitter under test to have sufficiently small overshoot. Specific values of OMA, jitter, and transition time are no longer of significance, since the eye mask test of the invention determines that the combined effect is sufficient.

Figure 5:
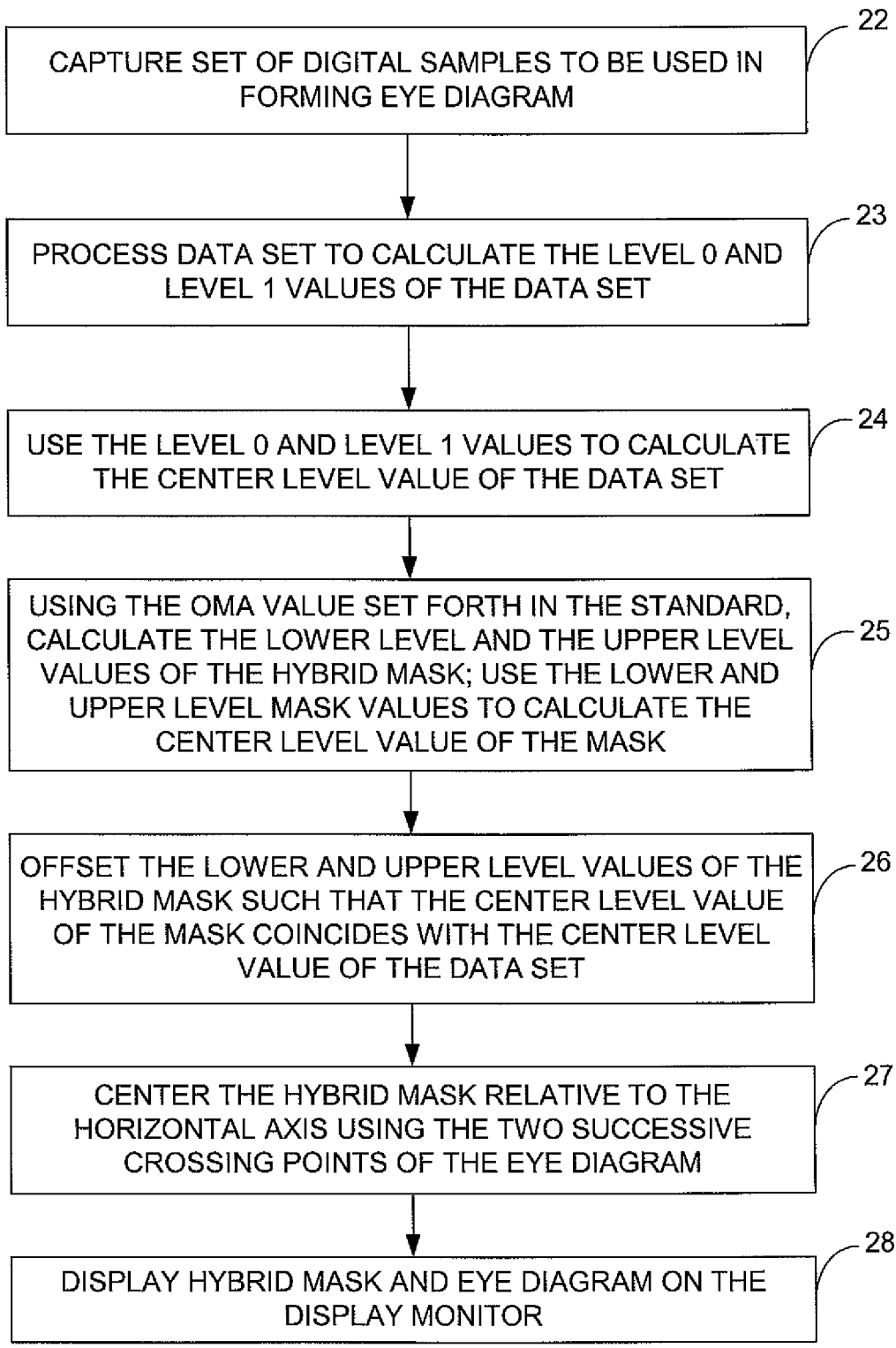
FIG. 5 illustrates a flowchart that represents the method of the invention in accordance with an embodiment for generating the hybrid eye mask shown in FIG. 3 and applying the eye mask to a captured data set to perform eye mask testing.

FIG. 5 illustrates a flowchart that represents the method of the invention in accordance with an embodiment. As indicated by block 22, a data set of digital data samples that will be used to form the eye diagram is captured. The captured data set is processed to calculate the level 0 and level 1 optical power level values for the data set, as indicated by block 23. The level 0 and level 1 optical power level values are used to calculate the center level for the data set, as indicated by block 24. Using the OMA value set forth in the applicable communications standard (or in a data sheet performance specification), the lower level, upper level and center level values for the hybrid mask are calculated, as indicated by block 25. The lower and upper level values of the hybrid mask are then offset such that the center level value of the hybrid mask coincides with the center level value of the data set, as indicated by block 26. The hybrid mask obtained at block 26 is centered relative to the horizontal axis using the two successive crossing points of the eye diagram formed from the data set, as indicated by block 27.

The eye diagram formed from the data set and the offset and centered hybrid eye mask defined in terms of absolute power level values are displayed on the display monitor to allow the user to observe whether any of the data samples fall within the interior of the mask (i.e., whether there are any hits). In this way, the user is able to determine whether the eye diagram demonstrates compliance or noncompliance of the transmitter with the eye mask testing requirements of the applicable standard, as indicated by block 28. As an additional, optional step, the mask may be expanded in the manner described above to allow the user to ascertain the largest margin to the mask that occurs for which there continue to be no points of the data set within the interior of the mask. It is not necessary for the eye diagram and eye mask to be displayed in order to determine whether the eye diagram "hits" the eye mask or to determine the mask margin. Rather, these determinations may be, and typically are, made by a processor of the CSA based on the eye mask and the eye diagram stored in memory.

It should be noted that although FIG. 5 shows steps 22-28 being performed in a particular order, the invention is not limited with respect to the order in which these steps are performed. As will be understood by persons of ordinary skill in the art in view of the description provided herein, the order in which the steps are performed may be changed and certain steps may be performed simultaneously, while other steps may be deleted altogether or combined into a single step.

Figure 6:
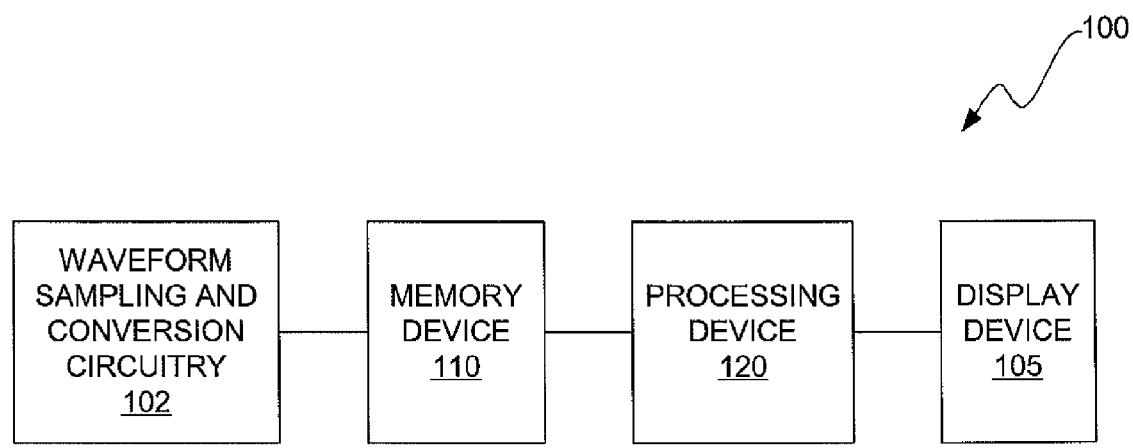
FIG. 6 illustrates a block diagram of an apparatus in accordance with an embodiment for testing transmitters using the hybrid mask described above with reference to FIGS. 2-5.

FIG. 6 illustrates a block diagram of an apparatus 100 in accordance with an embodiment for testing transmitters using the hybrid mask described above with reference to FIGS. 2-5. The apparatus 100 may be, for example, a CSA of the type currently available, but configured with hardware and/or software or firmware for generating the hybrid mask and applying the hybrid mask to an acquired data set. Thus, the apparatus 100 typically will comprise waveform sampling and conversion circuitry 102, a memory device 110, a processing device 120, and a display device 105. The sampling and conversion circuitry 102 samples an optical waveform and converts the samples into a data set of digital samples. The memory device 110 stores the digital data set. The processing device 120 processes the data set to calculate the level 0, level 1 and center level values of the data set and to generate the corresponding eye diagram. The processing device 120 also performs the algorithm described above with reference to blocks 25, 26 and 27 shown in FIG. 5 to calculate the lower level, upper level and center level hybrid mask values based on the OMA set forth in the applicable standard and to offset the lower level and upper level hybrid mask values such that the center level value of the hybrid mask coincides with the center level value of the data set. The processing device 120 stores the offset hybrid eye mask and the eye diagram in memory device 110. The processing device 120 is configured to cause the eye diagram and the hybrid mask to be displayed on the display device 105. The processing device 120 is also configured to process the eye diagram and the hybrid eye mask stored in memory device 110 to determine whether the eye diagram "hits" the eye mask and to determine the mask margin.

The block diagram shown in FIG. 6 is not intended to convey any particular type of architecture for the apparatus 100, but is merely intended to demonstrate the functional components of the apparatus 100. The components of the apparatus 100 may be made up of a variety of different types of circuits and may be configured in a variety of different ways. Thus, the apparatus 100 is not limited with respect to the types and configurations of components that are used to achieve the functionality depicted by the block diagram of FIG. 6. Persons of ordinary skill in the art will understand, in view of the description provided herein, the variety or implementation scenarios that are possible for performing the tasks described above with reference to FIGS. 2-6. The processing device 120 may be any type of suitable processing device and may be implemented in hardware, software or a combination of hardware and software or firmware. Examples of suitable processing devices include microprocessors, microcontrollers, application specific integrated circuits (ASICs), programmable logic arrays, programmable gate arrays (PGAs), etc. Also, the processing device may be a single processing device that performs all of the processing tasks associated with the method or multiple processing devices over which the processing tasks are distributed. Thus, the term "processing device", as that term is used herein, is intended to denote one or more processing devices.

The memory device 110 may be any type of computer readable medium, such as, for example, solid-state memory devices (e.g., RAM, ROM, PROM, EPROM, flash memory, etc.), optical storage devices and magnetic storage devices. To the extent that certain tasks performed by the processing device 120 are performed in software, the software may be stored in the memory device 110, in some other memory device (not shown), or in on-board memory of the processing device 120.

It should be noted that the invention has been described with reference to a few illustrative embodiments for the purposes of demonstrating the principles and concepts of the invention. The invention is not limited to these embodiments, as will be understood by persons of ordinary skill in the art in view of the description provided herein. Those skilled in the art will understand that modifications may be made to the embodiments described herein and that all such modifications are within the scope of the invention.

What is claimed is:

1. A method for performing eye mask testing in an optical communication system using a hybrid eye mask, the method comprising:

receiving a predetermined optical modulation amplitude (OMA) value in a processing device, wherein the predetermined OMA value is obtained from a specification for a part being tested;

in the processing device, using the predetermined OMA value to calculate a lower mask value and an upper mask value as first and second percentages, respectively, of the predetermined OMA value;

measuring a waveform produced by the part being tested and capturing a set of data samples corresponding to the measured waveform;

in the processing device, processing the captured set of data samples to determine a level 0 value and a level 1 value for the data set;

in the processing device, processing the level 0 and level 1 values to determine a center level value of the captured data set as an average of the level 0 and level 1 values;

in the processing device, calculating a center level mask value as an average of the lower and upper mask values;

in the processing device, subtracting the center level mask value from the center level value of the captured data set to obtain an offset center level value;

in the processing device, adding the offset center level value to the lower mask value to obtain an offset lower mask value and adding the offset center level value to the upper mask value to obtain an offset upper mask value, wherein the center level value of the captured data set and the offset lower and offset upper mask values define the hybrid eye mask;

in the processing device, generating an eye diagram from the captured data set; and in the processing device, analyzing the eye diagram and the hybrid eye mask to determine whether the part being tested passes an eye mask test.

2. The method of claim 1, further comprising:
as part of analyzing the eye diagram and the hybrid eye mask, the processing device centers the hybrid eye mask relative to two time-successive crossing points of the eye diagram.

3. The method of claim 2, further comprising:
displaying the eye diagram and the hybrid eye mask on a display device.

4. The method of claim 3, wherein the analysis of the eye diagram relative to the hybrid eye mask includes an analysis that determines whether or not the eye diagram intersects the hybrid eye mask, wherein if a determination is made that the eye diagram does not intersect the hybrid eye mask, the part being tested is deemed to meet one or more transmitter attribute requirements.

5. The method of claim 4, wherein said one or more transmitter attribute requirements include a rise time requirement.

6. The method of claim 4, wherein said one or more transmitter attribute requirements includes a fall time requirement.

7. The method of claim 4, wherein said one or more transmitter attribute requirements include a deterministic jitter (DJ) requirement.

8. The method of claim 4, wherein said one or more transmitter attribute requirements include a total jitter (TJ) requirement.

9. The method of claim 4, wherein said one or more transmitter attribute requirements include a pulse width shortening (PWS) requirement.

10. The method of claim 4, wherein said one or more transmitter attribute requirements include a transmission and dispersion penalty (TDP) requirement.

11. The method of claim 1, wherein the method is performed by a communications signal analyzer (CSA) system, the processing device being part of the CSA.

12. An apparatus for performing eye mask testing in an optical communication system using a hybrid eye mask, the apparatus comprising:
a memory device; and
a processing device, the processing device performing the eye mask testing by:
receiving a predetermined optical modulation amplitude (OMA) value in the processing device, wherein the predetermined OMA value is obtained from a specification for a part being tested;
processing a captured set of data samples representing a measured waveform to determine a level 0 value and a level 1 value for the data set;
processing the level 0 and level 1 values to determine a center level value of the captured data set as an average of the level 0 and level 1 values;
calculating a center level mask value as an average of the lower and upper mask values;
subtracting the center level mask value from the center level value of the captured data set to obtain an offset center level value;
adding the offset center level value to the lower mask value to obtain an offset lower mask value and adding the offset center level value to the upper mask value to obtain an offset upper mask value, wherein the center level value of the captured data set and the offset lower and offset upper mask values define the hybrid eye mask;
generating an eye diagram from the captured data set; and
analyzing the eye diagram and the hybrid eye mask to determine whether the part being tested passes an eye mask test.

13. The apparatus of claim 12, further comprising:
waveform sampling and conversion circuitry configured to measure the waveform and capture the set of data samples corresponding to the measured waveform wherein as part of analyzing the eye diagram and the hybrid eye mask, the processing device centers the hybrid mask relative to two time-successive crossing points of the eye diagram.

14. The apparatus of claim 13, further comprising:
a display device, the processing device causing the eye diagram and the hybrid eye mask to be displayed on the display device.

15. The apparatus of claim 13, wherein when the processing device analyzes the eye diagram relative to the hybrid eye mask, the processing device makes a determination as to whether or not the eye diagram intersects the hybrid eye mask.

16. The apparatus of claim 15, wherein if a determination is made that the eye diagram does not intersect the hybrid eye mask, the part being tested is deemed to meet one or more transmitter attribute requirements.

17. The apparatus of claim 16, wherein said one or more transmitter attribute requirements include one or more of a rise time requirement, a fall time requirement, a deterministic jitter (DJ) requirement, a total jitter (TJ) requirement, and a pulse width shortening (PWS) requirement.

18. The apparatus of claim 16, wherein said one or more transmitter attribute requirements include two or more of a rise time requirement, a fall time requirement, a deterministic jitter (DJ) requirement, a total jitter (TJ) requirement, and a pulse width shortening (PWS) requirement.

19. The apparatus of claim 12, wherein the apparatus comprises a communications signal analyzer (CSA) system.

20. A non-transitory computer-readable medium having a computer program stored thereon for performing eye mask testing in an optical communication system using a hybrid eye mask, the program comprising:

computer instructions for receiving a predetermined optical modulation amplitude (OMA) value, wherein the predetermined OMA value is obtained from a specification for a part being tested;

computer instructions for generating a hybrid eye mask based at least in part on the received predetermined OMA value, the computer instructions for generating the hybrid eye mask comprising:

computer instructions that calculate a lower mask value and an upper mask value as first and second percentages, respectively, of the predetermined OMA value, computer instructions that receive a captured set of data samples corresponding to a measured waveform, computer instructions that process the captured set of data samples to determine a level 0 value and a level 1 value for the captured data set, computer instructions that process the level 0 and level 1 values to determine a center level value of the captured data set as an average of the level 0 and level 1 values, computer instructions that calculate a center level mask value as an average of the lower and upper mask values, computer instructions that subtracting the center level mask value from the center level value of the captured data set to obtain an offset center level value, and computer instructions that add the offset center level Value to the lower mask value to obtain an offset lower mask value and that add the offset center level value to the upper mask value to obtain an offset upper mask value, wherein the center level value of the captured data set and the offset lower and offset upper mask values define the hybrid eye mask;

computer instructions that generate an eye diagram from the captured data set; and computer instructions that analyze the eye diagram and the hybrid eye mask to determine whether the part being tested passes an eye mask test.

21. The non-transitory computer-readable medium of claim 20, wherein the program further comprises:

computer instructions for measuring a waveform and capturing the set of data samples corresponding to the measured waveform.

22. The non-transitory computer-readable medium of claims 21, further comprising:

computer instructions for causing the eye diagram and the hybrid eye mask to be displayed on a display device.

\* \* \* \* \*